United States Patent [19]

Hall

[11] 4,058,228
[45] Nov. 15, 1977

[54] PASSENGER VEHICLE ACCESS STAIR AND ELEVATOR APPARATUS

[76] Inventor: Edward L. Hall, 16240 NE. 14 St., Bellevue, Wash. 98008

[21] Appl. No.: 663,770

[22] Filed: Mar. 4, 1976

[51] Int. Cl.² .............................................. B60P 1/44
[52] U.S. Cl. ................................. 214/77 R; 105/433; 105/449; 182/88; 280/166; 214/146.5
[58] Field of Search ............... 214/75 R, 75 G, 75 H, 214/75 T, 77 R, 77 P, 146.5; 280/166; 182/88, 96; 105/430, 433, 443, 447, 449

[56] References Cited

U.S. PATENT DOCUMENTS

| 2,989,196 | 6/1961 | Lugash | 214/77 P |
| 3,516,559 | 6/1970 | Walter | 214/75 R |
| 3,599,810 | 8/1971 | Wanko | 214/77 R |
| 3,874,527 | 4/1975 | Royce | 214/77 R |
| 3,893,697 | 7/1975 | Blitz et al. | 214/77 R X |
| 3,912,048 | 10/1975 | Manning | 214/75 R X |

OTHER PUBLICATIONS

Ontario Transportation Development Corp., "Small Bus for the Handicapped" (brochure) June 1974.

Primary Examiner—L. J. Paperner
Attorney, Agent, or Firm—Christensen, O'Connor, Garrison & Havelka

[57] ABSTRACT

A combination access stairstep and elevator means for use in a passenger vehicle entryway. In its retracted normal position a passenger elevator platform member projects freely into the entryway part of its width below passenger deck level to serve as an access step for passengers who can ascend and descend on foot. Such platform member is mounted as part of a dual-arm parallelogram linkage mechanism on a guided, horizontally reciprocative carriage, the various parts of which in normal position are compactly stowed at a common level out of the entryway passage beneath the passenger deck. In order to accommodate disabled persons, the platform member may be fully extended outward in the entryway for use in elevating crippled persons and passengers in wheelchairs between deck level and curb or ground level. Grab rails with rail posts mounted on the normally projecting portion of the platform member can serve as a steadying aid to passengers in all positions of the platform member.

15 Claims, 8 Drawing Figures

PASSENGER VEHICLE ACCESS STAIR AND ELEVATOR APPARATUS

BACKGROUND OF THE INVENTION

This invention relates to improvements in onboard devices to aid persons in boarding and leaving passenger buses and similar vehicles. The invention is herein illustratively described by reference to the presently preferred embodiment thereof as applied to an existing type of entryway in a conventional motor bus; however, it will be recognized that the novel principles involved may be embodied in varying configurations and to different types of passenger vehicles.

There have been a number of different vehicle-mounted boarding aids for use by crippled persons who cannot ascend and descend a stairway in the normal manner. Usually employing some sort of elevator platform that can be raised and lowered between inside passenger deck level and adjacent ground level or curb level, these devices largely have pre-empted the passageway in which mounted so as to require deployment and actuation of the elevator mechanism in its regular operating cycle in order to open up and utilize the entryway if it was to be used at all for ingress and egress. Consequently such vehicles as a practical matter were also required to have a separate entryway with one or more steps for normal passengers, thereby adding to the cost and restricting the efficient utilization of the full space within the vehicle. Attempts have also been made to provide elevator mechanisms permitting dual purpose use of the same entryway, that is, with the elevator means not in use stowed in such a manner as to provide a step and/or avoid interference with normal use of an existing entryway stair. These generally have not been commercially successful, however, presumably for such reasons as undue complexity with attendant reliability problems, cost, bulkiness and/or requirements for specially designed vehicles or extensive alterations in conventional vehicles to accommodate the mechanisms.

It is a principle object of this invention to provide improved passenger vehicle dual purpose entryway combined access stairstep and elevator means overcoming the foregoing and related problems and limitations. More specifically, an object is to provide a safe, reliable and practical passenger elevator or lift mechanism for use in physical association with the normal passenger entryways of conventional motor buses and other passenger vehicles and which, when stowed between periods of use as an elevator, presents no obstruction or hindrance to the regular use of stairs in that entryway by passengers entering and leaving the vehicle on foot.

A further object hereof is to provide a stowable elevator mechanism for the described purpose compatible with passenger vehicles of conventional design, and compactly stowable beneath the passenger deck of a vehicle so as to present no entryway obstruction, no interference with operation of the entryway doors, and no downwardly projecting parts that could reduce the ground clearance beneath the vehicle. A related objective is to devise such a mechanism with base support and guide means fixed to the vehicle, and deployable mechanism and actuators therefor which, when stowed, are arranged when folded so as to lie substantially at the same level of height and to occupy a minimum horizontal spread in either breadth or width dimensions and thereby to lend the mechanism well to incorporation readily in vehicles of conventional design with comparatively few and simple changes in the entryway and adjoining below-deck structure of the vehicle frame and body.

Still another purpose relating to the reliable simplicity, compactness and versatility of the mechanism is to enable utilizing the elevator platform member when in stowed position as a step, preferably the bottom step, in the entryway stair. By so doing, there is a further reduction in the space required for stowage of the mechanism below the passenger deck and, moreover, a related reduction in the length of the extension and retraction stroke of the actuator and guide means to move the platform member outwardly for deployment and inwardly for stowage.

The invention also is concerned with achieving by a simple and reliable mechanism the necessary full range of elevating and selective lowering movements of the extended platform member both above and below the normal stowage level thereof, and in the course of such movements, maintaining the platform member steadily horizontal. Furthermore in the process of elevating the platform member to deck level the same mechanism also draws it gradually inward into abutment with the passenger deck, whereas in the reverse motion the platform member moving gradually away from the deck can be lowered gently with fluid actuator damping to any desired stopping level where it settles upon an adjacent elevated sidewalk, or in rural areas, upon a street or roadside surface at lower level. Thus wheelchair users can safely enter and leave the vehicle without other assistance using the same entryway as normal passengers by way of the usual step or stairs also occupying the entryway.

A related and more specific object is to utilize the retracted elevator platform member serving as a bottom step in the entryway as a support for steadying rail and rail post means in convenient position at either or both sides of the entryway for normal passengers to use with the elevator mechanism retracted, which rail and rail post also serve as a safety barrier and hand grab for crippled persons or persons in a wheelchair throughout their boarding and departure travel on the elevator.

These and other objects will become more fully appreciated or evident as the description of the invention in its preferred embodiment proceeds hereinbelow.

SUMMARY OF THE INVENTION

As herein disclosed the combination entry step and passenger elevator apparatus of this invention comprises a horizontally disposed platform member which in its retracted or normal position projects freely part of its width outwardly in the passenger vehicle entryway to function as a stairstep, the lower step if, as is usual, the entryway stairs include more than one step. Rail posts upstanding from the projecting part of the platform member at opposite sides of the entryway serve with the platform member retracted to aid normal passengers entering and leaving the vehicle on foot. When a crippled person who cannot ascend the stairs desires to embark, the vehicle operator can deploy the platform member horizontally outward to its full width, then downwardly until it rests upon the adjacent curb or ground surface to accommodate the crippled person or the wheelchair carrying the person. Thereupon the platform member maintained horizontal is raised and drawn inward into position level with and abutting the passenger vehicle deck; the operation being performed in reverse when a crippled person is to disembark.

The invention includes a platform member carriage means movable inward and outward on horizontal guides fixedly mounted on opposite sides of the entryway substantially at the desired level of the platform member in its retracted normal position. Parallel sets of arms pivoted at one end on the carriage means movably support the platform member by their pivotal connections to points spaced widthwise of the latter to form a parallelogram linkage with the platform member. With the platform member retracted, the linkage is completely folded or collapsed, occupying very little vertical space, with the arms, platform member and track means being substantially in horizontal alignment or at a common level. Extension of the carriage means clears the arms and platform member to swing downwardly and upwardly through an outward arc so as to move the platform member between its depressed and elevated positions described above, the arms being swung through an arcuate range approaching 90° below and 90° above their normal horizontal position to effect such movement of the platform member. Controlled conjoint swinging of the arms in this regime is preferably effected by hydraulic actuator means working through roller chains that enwrap sprockets converting lineal actuator motion into rotary motion of the platform member support arms.

These and other features, objects and advantages of the invention will become more fully evident as the description proceeds by reference to the accompanying drawings.

DETAILED DESCRIPTION OF PREFERRED EMBODIMENTS

Figure 1:
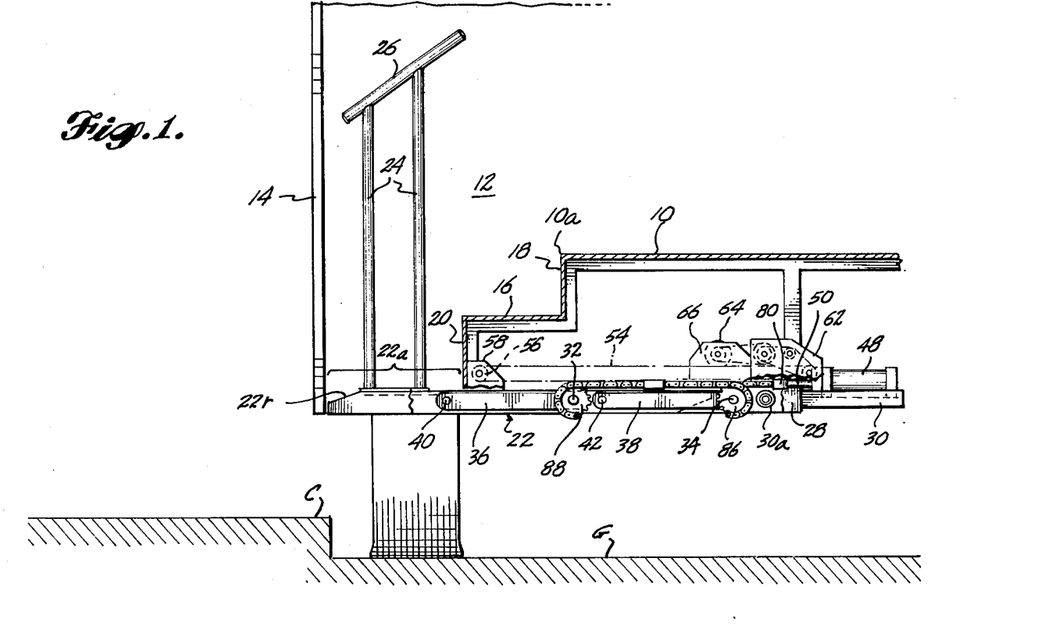
FIG. 1 is a side elevation view, partly in section, showing the mechanism in the retracted normal position of the platform member, wherein it serves also as a vehicle entryway stair step, with the vehicle entryway doors shown closed.

Referring to FIGS. 1 to 5, the vehicle parts with which the main illustrated embodiment cooperates include the passenger deck 10, the outer edge 10a which adjoins the passenger entryway 12 that is normally closed by doors 14 in conventional manner. In this instance the doors are shown as representing folding panels that hinge to each other and to the vehicle frame at one or both upright outside corners of the entryway 12 and that can be drawn back to one or both sides of the entryway so as to open in up fully for ingress and egress of passengers. In all large passenger vehicles such as motor buses, trolleys, etc., the passenger deck 10 is elevated sufficiently above ground level G so as to require suitable stairs in the vehicle entryway for foot passengers to enter and leave the vehicle. In the illustration there is an upper first step 16 joined by a riser 18 at its inner edge and extending upwardly to join the passenger deck edge 10a, and adjoined at its opposite edge by a riser 20 extending downwardly by stairstep height. Immediately beneath the lower edge of the latter riser 20, a horizontal platform member 22 is disposed in retracted position. It has a forward or outer portion 22a that in the normal or retracted position of the platform member 22, as shown in FIG. 1, projects outwardly to form a bottom step of the stairway. This bottom step is at a convenient height in relation to ground level G or curb level C for ingress and egress for normal passengers on foot.

The projecting stairstep portion 22a of platform member 22 carries passenger handrail or steadying supports in the form of upright posts 24, preferably a pair at opposite edges of the projecting portion 22a adjacent opposite sides of the entryway 12, with a handrail 26 mounted on the top of each pair of posts. This handrail arrangement will suffice to aid normal passengers in entering and leaving the vehicle without necessity for any additional or separate handrails or grabs, at least in the outer portion of the entryway 12. Moreover, being carried fixedly on the platform member 22, the one or two pairs of posts 24 and handrails 26 serve a useful and important function when the platform member is extended and operated as part of an elevator to raise and lower persons who are crippled or who are in wheelchairs as hereinafter described.

Figure 5:
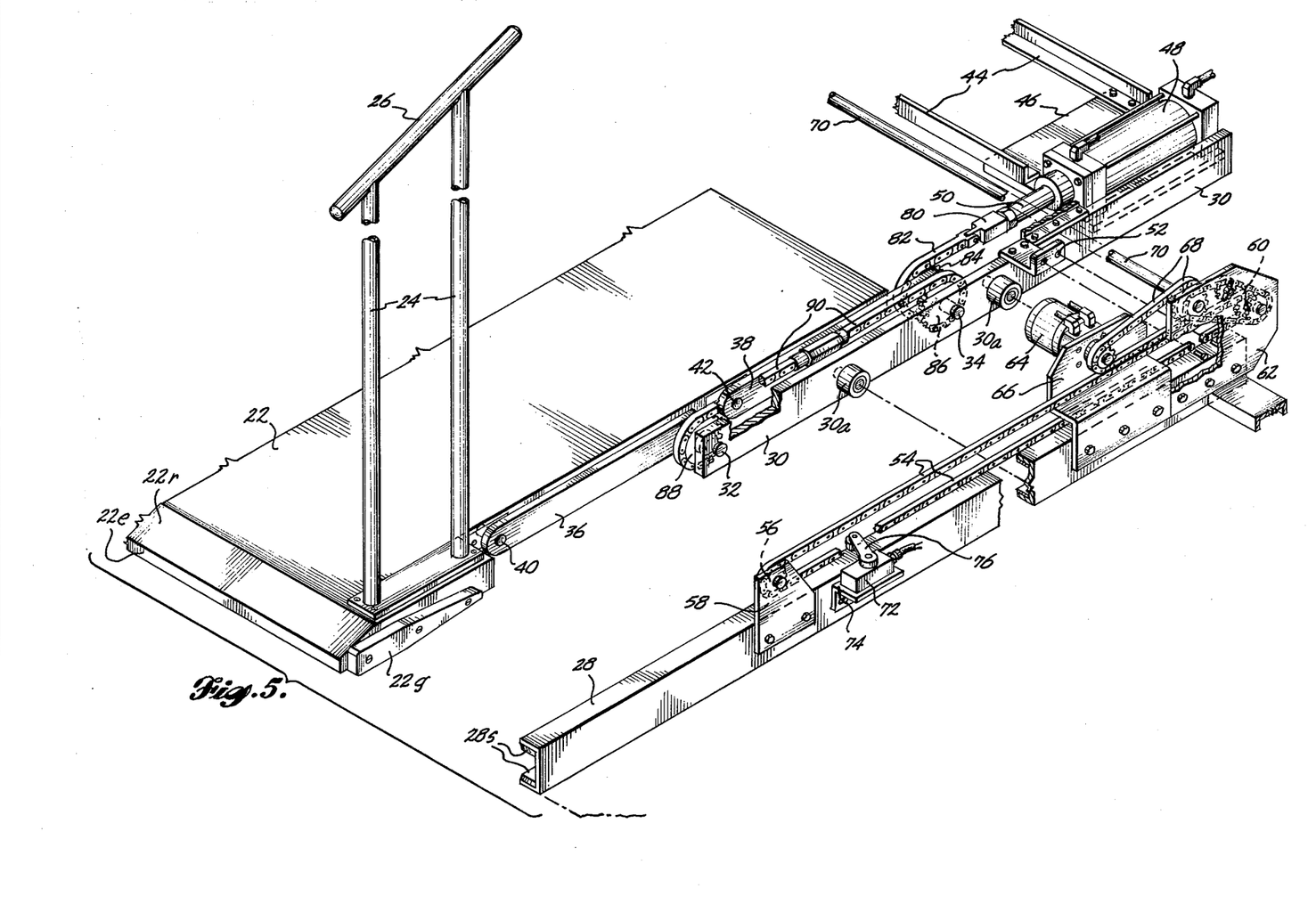
FIG. 5 is an exploded isometric view of portions of the apparatus at an enlarged scale with parts separated and others broken away to facilitate illustration.

Guiding support means for the platform member 22 and its associated mechanism by which the platform member is to be supported in all positions includes a pair of structural channels 28 mounted horizontally on the vehicle frame in parallel relationship on respectively opposite sides of the entryway 12 with the flanges of each channel directed toward the opposing channel. The guide channels 28 are mounted at an elevation just beneath the lower edge of the lower stairway riser 20 and each receives the guide rollers 30a of a carriage bar 30. In FIG. 5 the apparatus including one of the guide channels 28 and guide bars 30 is depicted in order to illustrate the functional parts and a portion of the platform on one side of the entryway, the remaining portions being broken away for convenience in the illustration. With rollers 30a received between the flanges of guide channel 28 as depicted in FIG. 5 and elsewhere in the views, the carriage bar 30, substantially at the level of the guide channel, is supported to move longitudinally along the guide channel inwardly and outwardly of the entryway of the vehicle. Each carriage bar 30 in turn pivotally mounts on pivot shafts 32 and 34 spaced lengthwise thereof, the respective links or arms 36 and 38, which at their opposite ends are supportively connected by the respective pivots 40 and 42 to the adjacent side of platform member 22. In the normal or retracted position of the platform member and its supporting mechanism, the links 36 and 38 are folded substantially into alignment, thereby to position the platform member 22 substantially in the common horizontal plane defined by the opposed tracks 28, carriage bars 30 and the folded pairs of links 36 and 38 at the respectively opposite sides of the platform member. It will therefore be seen that the platform member and associated carriage-track mechanism that supports and guides it for stowage and for movement into and from its stowed or retracted position is compactly arranged so as to require very little vertical clearance or space beneath the entry stairway and vehicle passenger deck in the normal or stowed position of the mechanism, and also so as to avoid creating any problems of reducing ground clearance beneath the vehicle by its presence in that mounted location.

In order to move the platform member longitudinally in a horizontal plane between the platform member's normal or retracted position and its extended position by means of the roller supported carriage bars 30, it is preferred to rigidly interconnect the carriage bars by frame cross members 44 that rigidify the carriage means. Additionally plates 46 are bolted, welded or otherwise secured to the end portions of the respective frame members 44. Members 44 extend transversely in substantially the horizontal common plane mentioned above between the inner end portions of the carriage bars 30, that is inwardly from the platform member 22 and beneath the passenger deck 10.

The carriage plates 46 each mount a double-acting type conventional hydraulic or pneumatic jack 48 including a piston rod 50 projecting endwise from the cylinder unit of the jack. These jacks operate the respective sets of link mechanisms, and while there are two jacks shown in this embodiment it will be seen that a single jack with connecting means leading to both arm sets may also be used.

Figure 8:
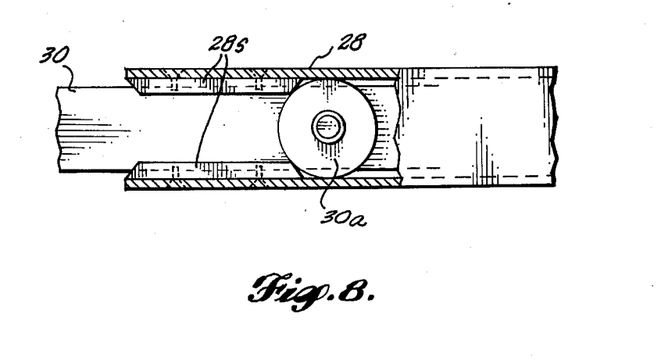
FIG. 8 is an enlarged detail of outer limit stops for the platform.

To move the carriage assembly bars 30 along tracks 28, each such bar is connected by a bracket 52 to the upper run or stretch of an endless transport chain 54 disposed horizontally in a long loop above and mounted upon the adjacent stationary guide channel 28. The outer end of the chain loop thus encircles a guide idler sprocket 56 rotationally mounted on a support bracket 58 and the inner end of the chain loop is guided around a driven sprocket 60 rotationally supported on a stationary bracket 62. Sprocket 60 can be rotated under power in either direction by means of a reversible motor 64, fluid driven or electric, mounted on a stationary bracket 66 and acting through a speed reduction mechanism 68, in this case comprising a chain and sprocket drive means. A cross shaft 70 extends between the primary drive mechanism 68 to a companion drive mechanism that turns the counterpart sprocket 60 for the opposing carriage bar's transport chain 54. Hence, reversible driven rotation of the transport chains 54 are synchronized so as to exert extension and retraction forces and displacements on the opposite carriage bars 30 that are equal and simultaneous and thereby prevent any tendency for racking or binding of the carriage assembly mechanism in its opposite guide channels 28. As shown in FIG. 8, outer guide rollers 30a coming into abutment with stop bars mounted just inside the ends of guide channels 28 define the outer limit of platform extension movement attainable. Limit switch 72 fixedly mounted on bracket 74 near the outer guide sprockets 56 adjacent one of the transport chains 54 is automatically actuated when the platform reaches the end of its extension stroke on transport motor 64 operating in one direction of rotation. To that end, this switch has a control arm 76 that projects into the path of chain-mounted bracket 54, and in so doing performs a primary enabling control function, namely permitting the jacks 48 to go into operation to permit lowering or to cause raising of the platform. A second function of switch 72 could be to interrupt energization of the motor 64 when the carriage reaches its outer limit of travel. In any case the limit switch prevents premature or untimely actuation of jacks 48 that could damage the mechanisms by causing the platform support arms to attempt to raise or lower the platform until all parts are clear of the stairway structure. If desired, alignment switch means (not shown) also controlled by platform position could be provided to perform a platform retraction enabling function.

Assuming the carriage mechanism supporting the platform member 22 as depicted in FIGS. 1 and 5 has been fully extended of sufficiently so to actuate switch 72 and thus permit the control system to start the elevating or depressing movements of the platform member, the hydraulic jack units 48 may be brought into play through arm drive mechanisms that operate to raise or lower the adjacent pairs of platform member support arms or links 36, 38 respectively. To this end, each hydraulic jack piston rod 50 is secured by a coupler 80 to a chain 82 that extends to, partially enwraps and is fastened to a sprocket 84 drivingly connected to arm 38 through arm support shaft 34. Preferably a second sprocket 86 is also keyed to shaft 34 and is rotatively coupled by a chain 90 to similar sprocket 88 mounted on and keyed to a shaft 32 that rotatively supports and is keyed to arm 36. Chain 90 extends partially around and has its ends secured to each of the sprockets 86 and 88 so as to cause arms 36 and 38 to be swung or swing conjointly.

In this embodiment the double-acting type jacks 48 need only act in one direction, namely to elevate the platform member 22 by swinging the arms 36 and 38 conjointly upwardly. For the opposite direction of motion, the hydraulic jack is used in conventional manner as a dampening or retarding device such that the weight of the platform member 22 and its load do not cause the platform member to descent too rapidly. If desired, operator controlled relief valve means in the hydraulic circuit (not shown) of the jacks may be controlled variably by the vehicle operator in known manner so as to vary the descent rate, or to stop it altogether at any point, for that matter. Initiation of descent of the platform member 22 is started by automatic extension of spring-urged plungers 200 carried by rods that react back against springs (not shown) in housings 202. Such springs are compressed by arms 38 bearing against plungers 200 as the platform member is approaching its final elevated position.

Hydraulic pressure supply systems and associated circuits and controls suitable for operating motor 64 and actuator jacks 48 in the manner and for the purpose described are or may be of conventional straightforward design employing well known and available components. Because understanding of this invention is not dependent upon nor is it limited to such design details or upon operating steps and sequences nor upon the degree to which they may be automatically or manually started, stopped or controlled, all within the capability of everyday engineering skill, the present disclosure has not included such details.

Figure 2:
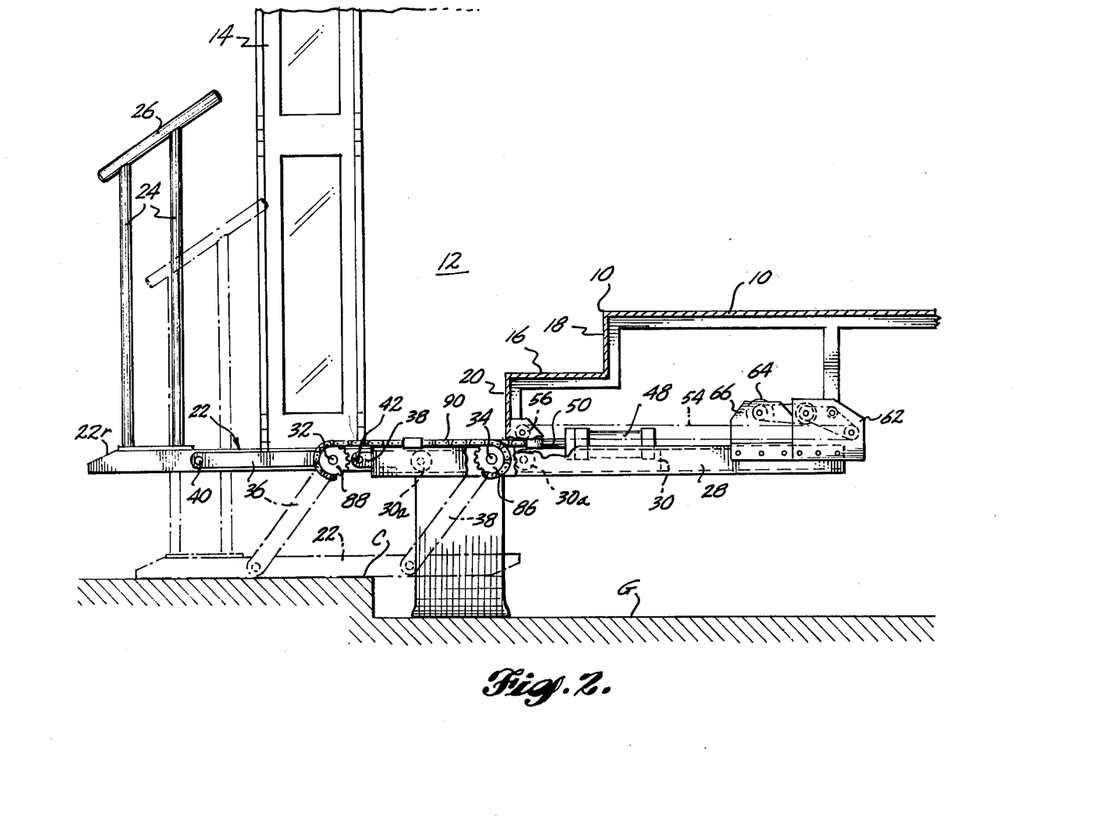
FIG. 2 is an elevation view generally similar to FIG. 1 with the platform member extended and lowered to curb level for passenger boarding, with the vehicle doors opened.
Figure 3:
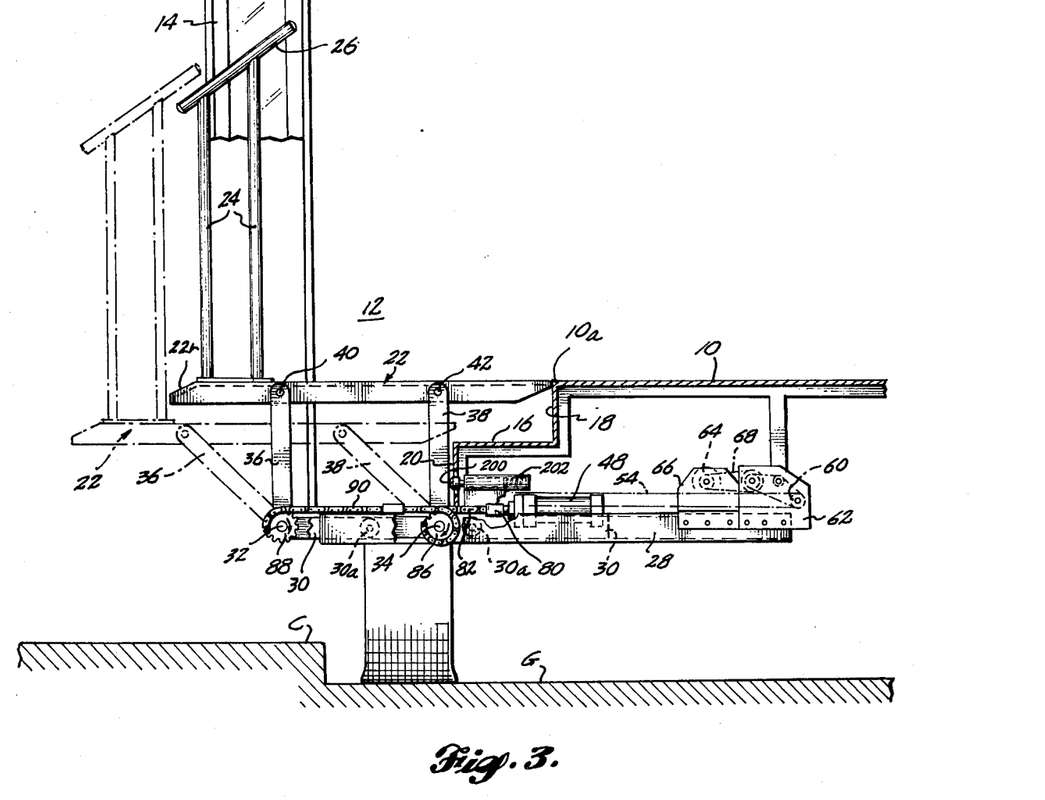
FIG. 3 is a side elevation view similar to FIG. 1 with the platform member elevated and abutted to the vehicle passenger deck and with the vehicle doors open.
Figure 4:
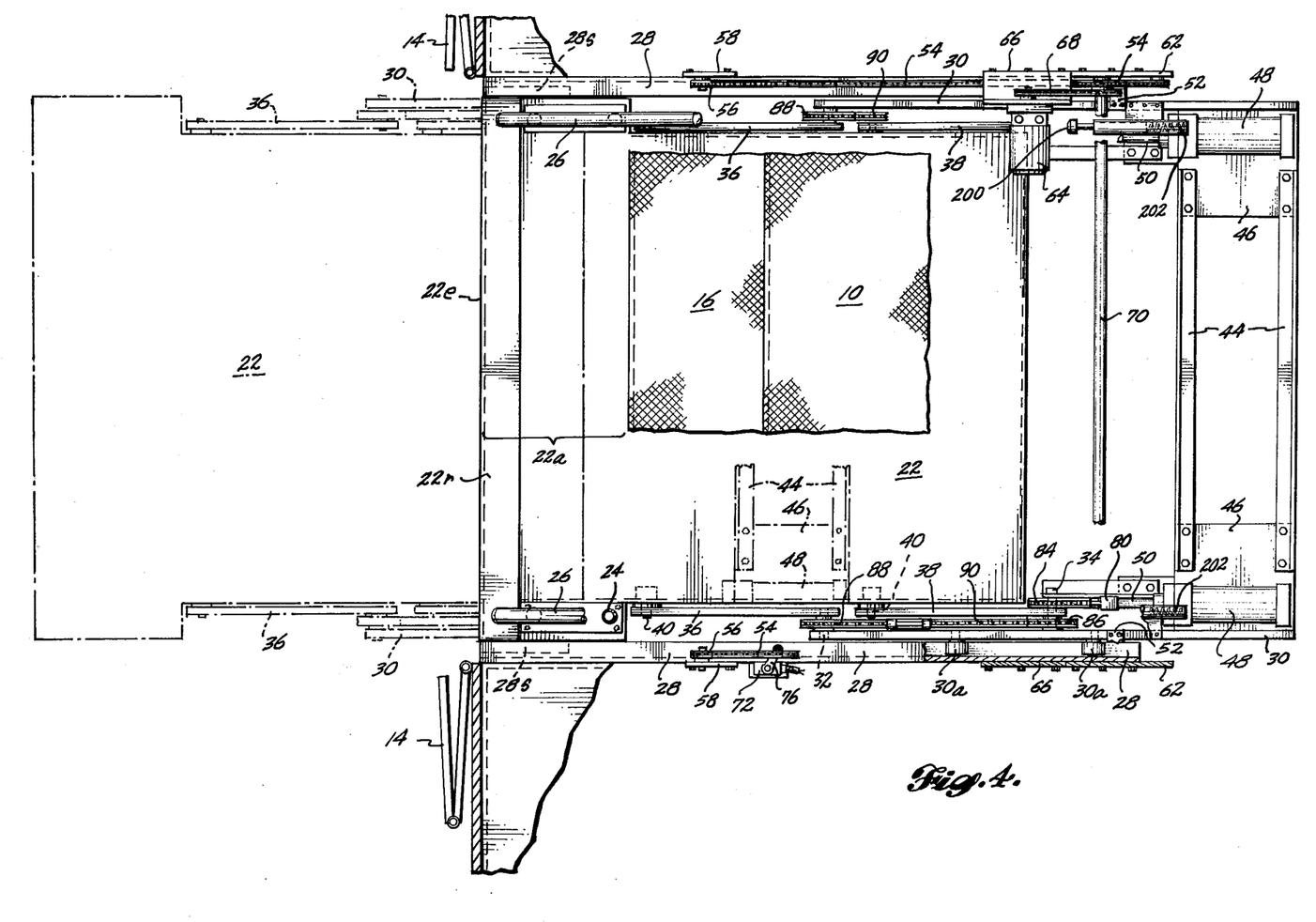
FIG. 4 is a plan view of the vehicle entryway and combined step and elevator apparatus, showing by solid lines the platform member retracted in its normal position and by broken lines the platform member fully extended, with the vehicle entryway doors shown open.

Unless earlier interrupted in its descent, the platform member continues to descend as in FIG. 2 until it rests upon a curb or the underlying ground surface upon which the vehicle is standing. The length of the linkage arms 36, 38 is established such in relation to their supported height on the carriage mechanism bars 30 above ground level as to permit the platform member 22 to reach fully to the ground when the arms have swung downwardly into or approaching vertical positions with the platform member 22 fully extended from beneath the stair structure as shown in FIG. 2. Likewise the length of the pairs of arms 36, 38 is established such in relation to the difference in height between the passenger deck 10 and the level of carriage bars 30 of the arms following an outward arc raises the platform member 22 to the level of the deck 10 and brings the inner edge of the platform member into abutment with the edge of the deck at the vehicle entryway 12 as the arms 36, 38 reach or approach vertical position (FIG. 3). It will be noted that the arms 36, 38 swing conjointly and that they, in conjunction with the platform member 22, the carriage mechanism and associated guides 28, form a parallelogram linkage which is effective to maintain the platform member 22 disposed horizontally throughout its range of elevating and descending motion accompanied by the necessary inwardly and outwardly directed travel to move it between a position of abutment with the deck 10 and the adjacent curb or ground surface to be reached. It will also be noted that this outward arc of travel of the arms and thereby of the inner edge of the platform member 22 causes the inner edge to clear the step 16 in the process of approaching and receding from elevated position of the platform member 22. (FIG. 3.)

As best seen in FIG. 5 the platform member 22 has a sloping entrance ramp 22r with a narrow or low leading edge 22e that enables the platform member to have the necessary thickness for structural purposes while making it comparatively easy for the occupant of a wheelchair to enter and leave the platform member from the ground surface. On each of opposite sides of the projecting portion of the platform member near its outer edge there is a wedge-shaped guide 22g that extends longitudinally thereof, tapering inwardly in thickness. The wedge enters between slide shoes 28s inside the flanges of each guide channel 28 near its outer end so as to assure positive guidance and support being imparted by the guides 28 directly to the projecting outer end portion of the platform member 22 when it is being drawn inwardly toward its normal or retracted position and while it occupies retracted position wherein its outer portion serves as a fixed vehicle entry step (FIG. 1).

The sets of upright posts 24 and handrails 26 move with the platform member that supports them, of course, and thereby serve as a means to assist wheelchair occupants and other disabled pesons to enter upon and steady themselves when they are supported by the platform member. Thus as the platform member is being raised to deck level from the position shown in FIG. 2 into the final position shown in FIG. 3, the occupant enjoys the security provided by such rails and rail posts. The same is true in reverse when the platform member, raised initially to the deck level as shown in FIG. 3, carries a passenger back to ground level. Gates, safety rails, barriers, leading edge switch bars (like passenger elevator door closure protector switch bars, etc.), installed at various safety points, and other forms of protectors may also be mounted on or in association with the platform member or adjacent structural parts for the additional safety and protection of persons using the same as an elevator if desired.

In operation, let it be assumed that the platform member 22 occupies its initial or normal retracted position as depicted in FIG. 1. In this position the platform member's projecting outer portion 22a serves as the lowermost step of the stairway including the intermediate or upper step 16, and the posts and handrail 26 occupy convenient positions at respectively opposite sides of the vehicle entryway 12 to aid normal foot passengers in entering and leaving the vehicle by way of the entryway 12. It will be evident, of course, that the outermost edge of the platform member 22 in this normal position is disposed inwardly of the vehicle entry door 14 so that the doors can be closed in the usual manner and that none of the mechanical parts of the mechanism that supports the platform member 22 present any barrier to, or interference with, the usual and normal use of the vehicle entryway 12. Under these conditions it will be noted that the retracted platform member 22 is supported by means of the pairs of arms 36 and 38 aligned along respectively opposite edges thereof adjacent the sides of the entryway, and that these arms together with the carriage bars and associated support tracks 28 that guide and support the carriage bars all lie in substantially a common plane or substantially at the same horizontal level. Moreover most of the mechanism that actuates and controls the operation of the carriage arms 36, 38 and that moves the carriage bars inwardly and outwardly along the tracks 28 are protected from beneath by structural elements such as the track member lower flanges themselves. Hence stones and other objects bouncing upwardly from the road surface are not likely to produce damage. If desired, because permitted by the shallow compact construction and high ground clearance of the mechanism, additional shielding (not shown) may readily be mounted beneath the mechanism or at least that portion of the mechanism potentially vulnerable to damage by flying objects in the normal retracted position of the platform member.

Let it now be assumed that the vehicle has stopped to receive a wheelchair passenger occupying a position on the sidewalk or curb C where the vehicle stops. The vehicle operator using controls (not shown) first opens the vehicle doors 14, then operates the transport motor 64 in a direction which moves the transport chain 54 so as to turn the cross-connecting shaft 70 and thereby drives both carriage bars 30 in the direction of outward travel along the guide tracks 28 at opposite sides of the entryway. The carriage mechanism continues to move outwardly in this manner until either the operator turns off the motor 64 or the outer rollers 30a engage the stop plates 28s. At that point, actuating the limit switch 72 causes or permits operation of an actuation circuit (not shown) to increase or relieve pressure in the appropriate end of the elevator jacks 48 so as to either raise the platform or to permit the weight of the platform assembly to move downward by gravity (started by plungers 200) until the platform member rests upon the adjacent sidewalk (FIG. 2). By permitting gravity descent of the platform member there is no likelihood of overstressing any mechanical parts in the process of such deployment, such as by its attempting to crush a person's foot, or, in the extreme, attempting to jack up the side of the bus. During this latter, downward motion of the platform member, it is maintained in horizontal position by reason of the parallelogram linkage function of the sets of arms 36, 38. The passenger desiring to enter the vehicle will then roll the wheelchair up on the ramp 2r onto the platform member 22, with or without aid of the opposite side posts 24 and grab rails 26. When the passenger is securely situated on the platform member, the operator of the vehicle actuates a suitable control to energize the hydraulic jacks 48 in a direction which draws the respective drive chains 82 towards the jack and thereby rotates the arm drive sprockets 86 and 88 conjointly to raise the platform member in an outward arc of travel as depicted best in FIG. 3. This upward motion continues until the platform member is elevated to the point and is swung inwardly to the point that it is at the level of and abuts the passenger deck 10 (FIG. 3) whereupon the wheelchair occupant may easily roll the wheelchair into the passenger compartment of the vehicle on the passenger deck 10.

With the passenger safely aboard, and assuming no other passengers are to embark or disembark using the elevator platform member 22, the operator lowers the platform member until it is in its solid line, extended position, depicted in FIG. 2, that is aligned with the guide tracks 28. A suitable automatic sensing device may be employed if desired to sense this position and to establish the desired stopping point at which flow of fluid into or from the respective ends of the hydraulic cylinders of the jacks 48 is stopped. Thereupon the operator actuates a suitable control which drives the transport motor 64 in the reverse of the direction previously used so as to use the transport chain 54 to draw the platform member inwardly of the vehicle and beneath the stairway and passenger deck 10 as shown in FIG. 1. When the platform member reaches its desired stopping point (preferably established by stops [not shown] similar to stops 28s), the operator or a suitable automatic control will terminate energization of the transport motor 64 and, if desired, actuate locks (not shown) that secure the platform member in this retracted position.

Figure 6:
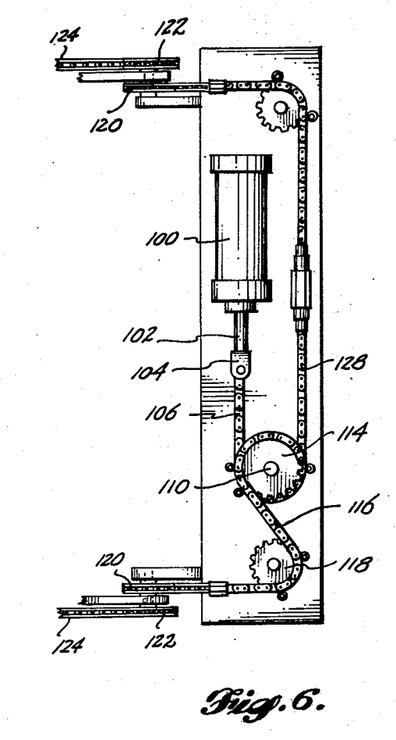
FIG. 6 is a simplified plan view of a modified actuator means for the platform member support arms.
Figure 7:
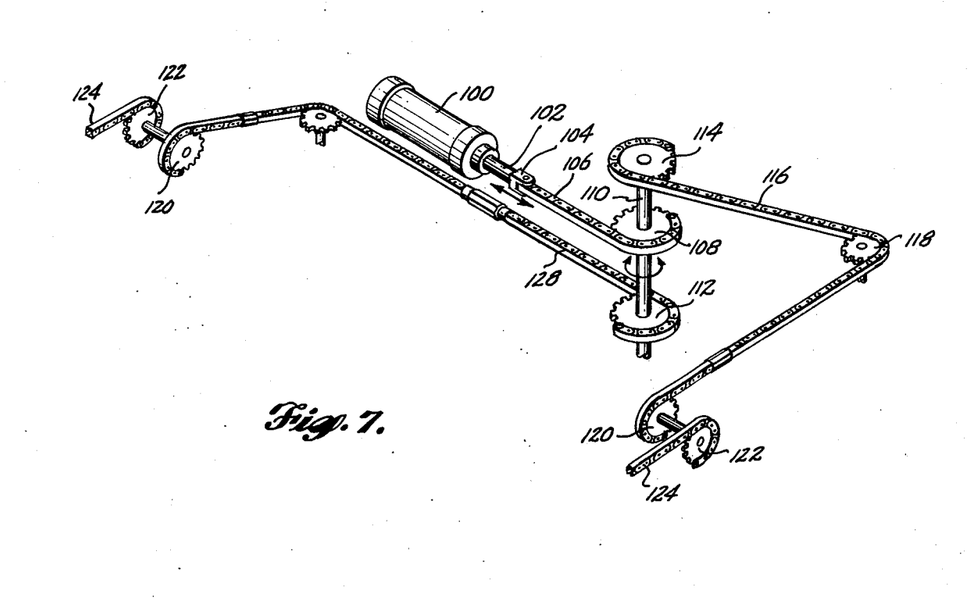
FIG. 7 is a simplified isometric view of the same modified means.

It will be evident from the foregoing description of the preferred embodiment of the invention that various changes and modifications may be made therein. For example, in FIGS. 6 and 7 there is shown a modified drive mechanism for raising and lowering the sets of platform member support links 36, 38, in this case using a single hydraulic jack 100 to operate the platform member support arms. As depicted, the hydraulic jack 100 is mounted on a transverse support extending between opposite sides of the mechanism, for example including the cross connecting bars 44. The piston rod 102 of hydraulic jack 100 is secured by means of a coupling 104 to a chain 106 that partially encircles and is secured to a driven sprocket 108. Sprocket 108 is keyed to a counter shaft 110 to which driven sprockets 112 and 114 are also keyed. Sprocket 114 is partially enwrapped by and secured to a chain 116 that, after passing around a sprocket 118, partially unwraps and is secured to another sprocket 120.

A sprocket 122 keyed in common with sprocket 120 to a common support shaft mounted on stationary bracket 126 is partially enwrapped by and secured to a chain 124 that is connected and functions in the same manner as chain 90 in the first embodiment to raise and lower the set of arms on the adjacent side of the platform member. A chain 128 associated with sprocket 122 is part of a similar drive train of sprockets and chains that act to raise and lower the set of platform member support arms on the opposite side of the platform member as will appear. This modified arrangement using a single hydraulic actuator is somewhat more compact and less expensive to manufacture than the dual actuator arrangement in FIGS. 1-5, but achieves the same results in the same way.

Having disclosed the invention in its preferred embodiment, it will be recognized that the essentials of the novel features and combinations of features have potential varying equivalent forms and arrangements and, therefore, that it is the intent that the appended claims not be restricted in their scope to the illustrative details.

What is claimed is:

1. In a passenger vehicle having a passenger deck therein accessible through an entryway including a foot passenger access stairway having a fixed passenger access step intermediate in height between the deck and ground level, vehicle-mounted passenger elevator apparatus mounted in cooperative association with said entryway comprising a horizontally disposed passenger platform member dimensioned to accomodate a wheelchair thereon, guiding support means including parallel supporting guides fixedly mounted at respectively opposite sides of said entryway beneath said deck and extending horizontally outward therefrom, and carriage means movably supported on said guides and in turn supporting said platform member normally in a retracted position substantially at the level of said guides and retracted at least part of its width beneath said deck, said guiding support means being formed and operable to guide said platform member for extension movement generally horizontally outward in said entryway from such retracted position and to an extended position and further operable to guide the extended platform member in a path of motion that clears said fixed step and that ranges both upward and downward from said level and inward and outward in said entryway between a raised position substantially flush with and adjacent to said deck and a lowered position beneath the height level of said fixed step and projecting outwardly therefrom to accomodate a wheelchair on said platform member while maintaining said platform member substantially horizontal, and actuator means operable through said guiding support means to move said platform member, when extended, between said lowered position and said raised position, and also between its extended and retracted positions.

2. The apparatus defined in claim 1, wherein the platform member in normally retracted position projects freely outward part of its width from beneath said access step and at a level above ground level and substantially the height of a passenger stairway step height increment beneath said access step, the projecting width of said normally retracted platform member adapting it to serve as an additional foot passenger access step in said entryway.

3. The apparatus defined in claim 2 wherein the platform member carries adjacent at least one side of the entryway hand rail means comprising at least one post upstanding from the projecting part of the platform member, and a hand grab on said post.

4. The apparatus defined in claim 3 wherein the guiding support means comprises a carriage assembly including base members extending lengthwise of and movably supported on said guides, and pairs of parallel arms pivotally connected by corresponding ends supportingly to respectively opposite sides of the platform member at spaced locations thereon and by their opposite ends to the respective base members, each such pair of arms, the platform member and one of said base members forming a parallelogram linkage, the arms lying substantially in a common horizontal plane with the platform member in its normally retracted position, said arms in the retracted position of the platform member projecting horizontally outward in the entryway from their ends connected to the base members, and with the platform member extended being operable by the actuating means to swing the platform member through a convex-outward arc between its raised and lowered positions through a path that clears said fixed step.

5. The apparatus defined in claim 4 wherein the actuator means includes means operable to swing the arms of the pairs conjointly, including rotative support shafts for the respective arms and rotative interconnections between such shafts including a sprocket wheel fixed on each shaft and means rotatively interconnecting such sprocket wheels.

6. The apparatus defined in claim 5 wherein the means rotatively interconnecting the sprocket wheels includes a chain stretched between and at least partially enwrapping each sprocket wheel, and the actuator means further includes fluid-pressurized actuator means connected to the arms and operable to raise the platform member under power and to control its rate of descent.

7. The apparatus defined in claim 2 including a fixed riser extending upward to the deck from the inner edge of said fixed step and a fixed second riser extending downward from the outer edge of said step to a horizontal lower edge of said second riser, said platform member in retracted position immediately underlying and projecting outwardly part of its width from beneath said lower edge to form a bottom access step in said entryway.

8. The apparatus defined in claim 1 including a fixed first riser extending upward to the deck from the inner edge of said fixed step and a fixed second riser extending downward from the outer edge of said step to a horizontal lower edge of said second riser, said platform member in retracted position immediately underlying and projecting freely outwardly part of its width from beneath said lower edge to form a bottom access step in said entryway.

9. In a passenger vehicle having a passenger deck therein accessible through an entryway including a passenger access stairway having a step intermediate in height between the deck and ground level, vehicle-mounted passenger elevator apparatus mounted in physical association with said entryway comprising a passenger platform member, guiding support means supporting said platform member normally in a retracted position disposed substantially horizontally retracted at least part of its width into said stairway at a level beneath said deck, said guiding support means being operable to guide said platform member for extension generally horizontally outward in said entryway and while extended to guide the platform member for movement upward and downward from said level between a raised position substantially flush with and adjacent to said deck and a lowered position while maintaining said platform member substantially horizontal, and operator controlled means operable to raise said platform member from said lowered position to said raised position and to lower the platform member back to said lowered position, and further operable to move the platform member between its retracted normal position and said raised and lowered positions, said platform member in retracted position projecting freely outward part of its width from beneath said deck to form a stairstep in said entryway and wherein said platform member carries adjacent at least one side of the entryway upright post means upstanding from the part of the platform member that projects to form the stairstep, and hand grab means on said post means.

10. In a passenger bus and the like having an interior passenger deck accessible through an exteriorly opening stairwell, the combination comprising movably mounted horizontal platform means having an upper tread surface including contiguous inner and outer portions extending across substantially the full width of the stairwell, platform support means operable to maintain said platform means in a normal retracted position wherein the tread surface outer portion projects in the stairwell and thereby forms a stairstep in said stairwell by which foot passengers may step down from and up to the passenger deck with the inner portion of said tread surface extending inwardly below said deck, said platform support means being operable to move said platform means horizontally outward from normal position to an outwardly displaced position in relation to the stairwell so as to present accessibly a wheelchair platform, and thereupon to elevate and depress said platform means above and below the level of its normal position between an elevated position at deck level with said inner portion of said platform means abutting the deck, and any of different depressed positions below said normal position so as to receive and discharge wheelchair passengers at different adjacent ground levels, said platform support means comprising elongated guide members stationarily mounted in the bus substantially horizontally at the level of the platform means in normal position on respectively opposite sides thereof and extending inwardly from the stairwell beneath the passenger deck, and platform carriage means supportively connect to the platform means and in turn movably supported by said guide members to permit movement of said carriage means and thereby of said platform means inwardly and outwardly in relation to the stairwell with the platform means at the level of its normal position, said carriage means including vertically movable members that support the platform means and that are disposed substantially at the horizontal level of said guide members and platform means in normal position, said vertically movable members being operable to raise and lower the platform means throughout the range between said elevated position and said different depressed positions, and actuating means operable to move the carriage means and thereby the platform means inwardly and outwardly along said guide members and further operable to move said vertically movable members up and down with the platform means in its outwardly displaced position.

11. The combination defined in claim 10 wherein the carriage means comprises elongated base members movably engaged with the respective guide members and movable outwardly to project beyond said guide members while remaining supported thereby, wherein the vertically movable members comprise pairs of platform means support arms pivotally connected in parallel relationship to the respective base members at spaced points therealong and to spaced points of respectively opposite sides of the platform means so as to form parallelogram linkages therewith, and wherein said carriage means, said arms, said track members and said platform means in its normal position are formed and arranged to lie substantially at a common horizontal level in the bus.

12. The combination defined in claim 11 wherein the bus stairwell further includes a fixed stairstep cooperating with and at a level intermediate the passenger deck and the stairstep formed by the platform means in normal position, and further wherein the pairs of arms supporting the platform means in its normal position extend outwardly from their respective connections to the carriage means base members to their respective connections to the platform means so as to swing the platform means in an outwardly convex arcuate path that clears said fixed stairstep in moving the platform means between its elevated and depressed positions.

13. The combination defined in claim 12 wherein the actuating means comprise interconnected chain and sprocket drives operatively connected to the respective pairs of platform means support arms.

14. The combination defined in claim 10 further including upright post means standing fixed upon the platform means adjacent at least one of the opposite sides of said outer portion thereof, and hand grip means mounted on said post means.

15. The combination defined in claim 11, wherein the guide members have elongated channels, the respective elongated base members have movable bearing elements engaged in said channels, and wherein the respective base members have stabilizing elements on their outer end portions snugly receivable in said channels with the base members retracted in relation to said guide members, thereby further rigidifying the interengagement between said base members and guide members with the platform member in normal position serving as a stairstep.

* * * * *